United States Patent
Ruberte Sanchez (10) Patent No.: US 10,190,506 B2
(45) Date of Patent: Jan. 29, 2019

(54) TURBOMACHINE BYPASS FLOW DIVERTING ASSEMBLY AND METHOD

(71) Applicant: United Technologies Corporation, Hartford, CT (US)

(72) Inventor: Jose E. Ruberte Sanchez, Jupiter, FL (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 478 days.

(21) Appl. No.: 14/953,483

(22) Filed: Nov. 30, 2015

(65) Prior Publication Data

US 2016/0153362 A1 Jun. 2, 2016

Related U.S. Application Data

(60) Provisional application No. 62/086,409, filed on Dec. 2, 2014.

(51) Int. Cl.
| | |
|---|---|
| *F02C 9/18* | (2006.01) |
| *F02K 3/077* | (2006.01) |
| *F02K 3/075* | (2006.01) |
| *F16K 11/052* | (2006.01) |

(52) U.S. Cl.
CPC ............... *F02C 9/18* (2013.01); *F02K 3/075* (2013.01); *F02K 3/077* (2013.01); *F16K 11/052* (2013.01); *F05D 2270/64* (2013.01)

(58) Field of Classification Search
CPC . F02K 3/075; F02K 3/077; F02K 3/02; F02K 3/04; F02K 3/06; F02K 3/062; F02K 3/065; F02C 7/12; F02C 7/185; F02C 9/18; F16K 11/052; F01D 17/14; F01D 17/18; F01D 17/10; F01D 17/105
See application file for complete search history.

(56) References Cited

U.S. PATENT DOCUMENTS

| | | | | |
|---|---|---|---|---|
| 3,386,658 | A | | 6/1968 | Mehr |
| 3,841,091 | A | * | 10/1974 | Sargisson ............ F02C 3/13 60/224 |
| 3,854,286 | A | * | 12/1974 | Klees ............... F02K 3/025 239/265.11 |
| 3,879,941 | A | * | 4/1975 | Sargisson ........... B64D 33/02 137/15.1 |
| 4,010,608 | A | * | 3/1977 | Simmons ............ F02K 3/075 60/226.3 |
| 4,054,030 | A | * | 10/1977 | Pedersen ............ F02K 3/075 415/145 |
| 4,060,981 | A | * | 12/1977 | Hampton ............ F02K 3/075 137/862 |

(Continued)

*Primary Examiner* — Gerald L Sung
*Assistant Examiner* — Alain Chau
(74) *Attorney, Agent, or Firm* — Carlson, Gaskey & Olds, P.C.

(57) ABSTRACT

An exemplary turbomachine exhaust flow diverting assembly includes an outer flow diverter distributed about a rotational axis of a turbomachine. The outer flow diverter moveable between a first position and a second position. The outer flow diverter in the first position permits more flow through a main bypass flow passage and less flow through a third stream bypass flow passage. The outer flow diverter in the second position permits more flow through the third stream bypass flow passage and less flow through the main bypass flow passage.

23 Claims, 9 Drawing Sheets

(56) References Cited

U.S. PATENT DOCUMENTS

| | | | | |
|---|---|---|---|---|
| 4,064,692 | A | * | 12/1977 | Johnson .................. F02K 3/075 60/762 |
| 4,072,008 | A | * | 2/1978 | Kenworth ............... F02K 3/075 60/262 |
| 4,085,583 | A | * | 4/1978 | Klees ...................... F02K 3/075 60/204 |
| 4,175,384 | A | | 11/1979 | Wagenknecht et al. |
| 5,307,624 | A | | 5/1994 | Even-Nur et al. |
| 5,694,767 | A | | 12/1997 | Vdoviak et al. |
| 7,614,210 | B2 | * | 11/2009 | Powell ...................... F02K 1/08 60/226.1 |
| 8,356,483 | B2 | | 1/2013 | Petty et al. |
| 9,194,331 | B2 | * | 11/2015 | Feldmann ............... F01D 11/24 |
| 2005/0072158 | A1 | * | 4/2005 | Christopherson ..... F01D 17/105 60/761 |
| 2013/0318981 | A1 | | 12/2013 | Kupratis |
| 2014/0041360 | A1 | * | 2/2014 | Feldmann ............... F01D 11/24 60/226.3 |
| 2014/0109589 | A1 | * | 4/2014 | Pritchard, Jr. .......... F02K 3/075 60/779 |
| 2014/0260180 | A1 | * | 9/2014 | Kupratis ................. F02K 3/075 60/204 |
| 2015/0121841 | A1 | | 5/2015 | Izquierdo et al. |

* cited by examiner

TURBOMACHINE BYPASS FLOW DIVERTING ASSEMBLY AND METHOD

CROSS-REFERENCE TO RELATED APPLICATION

This application claims priority to U.S. Provisional Application No. 62/086,409 filed Dec. 2, 2014.

BACKGROUND

This disclosure relates generally to diverting flow at or near an exhaust of a turbomachine.

Gas turbine engines are known and, typically, include a fan delivering air into a bypass duct as propulsion air and to be utilized to cool components. The fan also delivers air into a core engine where it is compressed in a compressor. The compressed air is then delivered into a combustion section where it is mixed with fuel and ignited. Products of the combustion pass downstream over turbine rotors, driving them to rotate.

One type of gas turbine engine has multiple bypass streams. In such engine, there is typically a radially outer bypass flow and a radially inner main bypass flow. Other types of gas turbine engines have other bypass flow arrangements.

SUMMARY

A turbomachine exhaust flow diverting assembly according to an exemplary aspect of the present disclosure includes, among other things, an outer flow diverter distributed about a rotational axis of a turbomachine, the outer flow diverter moveable between a first position and a second position. The outer flow diverter in the first position permitting more flow through a main bypass flow passage and less flow through a third stream bypass flow passage. The outer flow diverter in the second position permitting more flow through the third stream bypass flow passage and less flow through the main bypass flow passage.

In a further non-limiting embodiment of the foregoing assembly, the outer flow diverter pivots about a circumferentially extending axis to move between the first position and the second position.

In a further non-limiting embodiment of any of the foregoing assemblies, the circumferentially extending axis is at a leading edge of the flow diverter relative to a general direction of flow through the turbomachine.

In a further non-limiting embodiment of any of the foregoing assemblies, the outer flow diverter is tapered and has an apex at the leading edge.

In a further non-limiting embodiment of any of the foregoing assemblies, the outer flow diverter comprises a first flap and a second flap. The first flap is moveable independently from the second flap, and the second flap is moveable independently from the first flap.

In a further non-limiting embodiment of any of the foregoing assemblies, the first flap blocks more flow through the third stream bypass flow passage when the outer flow diverter is in the first position than when the outer flow diverter is in the second position. The second flap blocks more flow through the third stream bypass flow passage when the outer flow diverter is in the first position than when the outer flow diverter is in the second position.

In a further non-limiting embodiment of any of the foregoing assemblies, the outer flow diverter is at least partially axially aligned with a portion of a turbine exhaust case.

In a further non-limiting embodiment of any of the foregoing assemblies, the assembly includes an inner flow diverter distributed about a rotational axis of a turbomachine, the inner flow diverter positioned radially inside the outer flow diverter.

In a further non-limiting embodiment of any of the foregoing assemblies, the inner flow diverter is moveable between a first position and a second position, the inner flow diverter in the first position permitting more flow from a bypass flow passage to a core flow passage than the second position.

In a further non-limiting embodiment of any of the foregoing assemblies, the inner flow diverter is at least partially axially aligned with a portion of a turbine exhaust case.

In a further non-limiting embodiment of any of the foregoing assemblies, the inner flow diverter is pivotable about a circumferentially extending axis to move between the first position and the second position.

In a further non-limiting embodiment of any of the foregoing assemblies, the inner flow diverter is pivotable about a circumferentially extending axis that is radially aligned with a radially outer boundary of the core flow passage.

In a further non-limiting embodiment of any of the foregoing assemblies, at least a portion of the outer flow diverter is axially aligned with at least a portion of the inner flow diverter.

A turbomachine assembly according to another exemplary aspect of the present disclosure includes, among other things, a core flow passage extending axially from a fan section to an exhaust, a radially inner bypass flow passage that is radially outside the core flow passage, and a radially outer bypass flow passage that is radially outside the radially inner bypass flow passage. The assembly further includes an outer flow diverter moveable between a first position and a second position. The outer flow diverter in the first position permits more flow through the radially inner bypass flow passage and less flow through radially outer bypass flow passage. The outer flow diverter in the second position permits more flow through the radially outer bypass flow passage and less flow through the radially inner bypass flow passage. The assembly further includes an inner flow diverter moveable between a first position and a second position. The inner flow diverter in the first position permitting more flow from at least one of the radially inner bypass flow passage or the radially outer bypass flow passage to a core flow passage than the second position.

In a further non-limiting embodiment of the foregoing assembly, the outer flow diverter is radially aligned with a boundary between the radially inner bypass flow passage and the radially outer bypass flow passage.

In a further non-limiting embodiment of any of the foregoing assemblies, the inner flow diverter is radially aligned with a boundary between the core flow passage and the radially inner flow passage.

In a further non-limiting embodiment of any of the foregoing assemblies, the outer flow diverter is pivotable between the first position and the second position.

A method of diverting flow through an exhaust of a turbomachine according to an exemplary aspect of the present disclosure includes, among other things, at a first position, selectively permitting flow to move from a radially inner bypass flow passage to a core flow passage, and at a second position, selectively directing flow to move to the radially inner bypass flow passage, a radially outer bypass flow passage, or both.

In a further non-limiting embodiment of the foregoing assembly, the first position and the second position are at least partially axially aligned with a turbine exhaust case.

In a further non-limiting embodiment of any of the foregoing assemblies, the method includes pivoting an outer flow diverter when selectively directing flow to move to the radially inner bypass flow passage, a radially outer bypass flow passage, or both.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
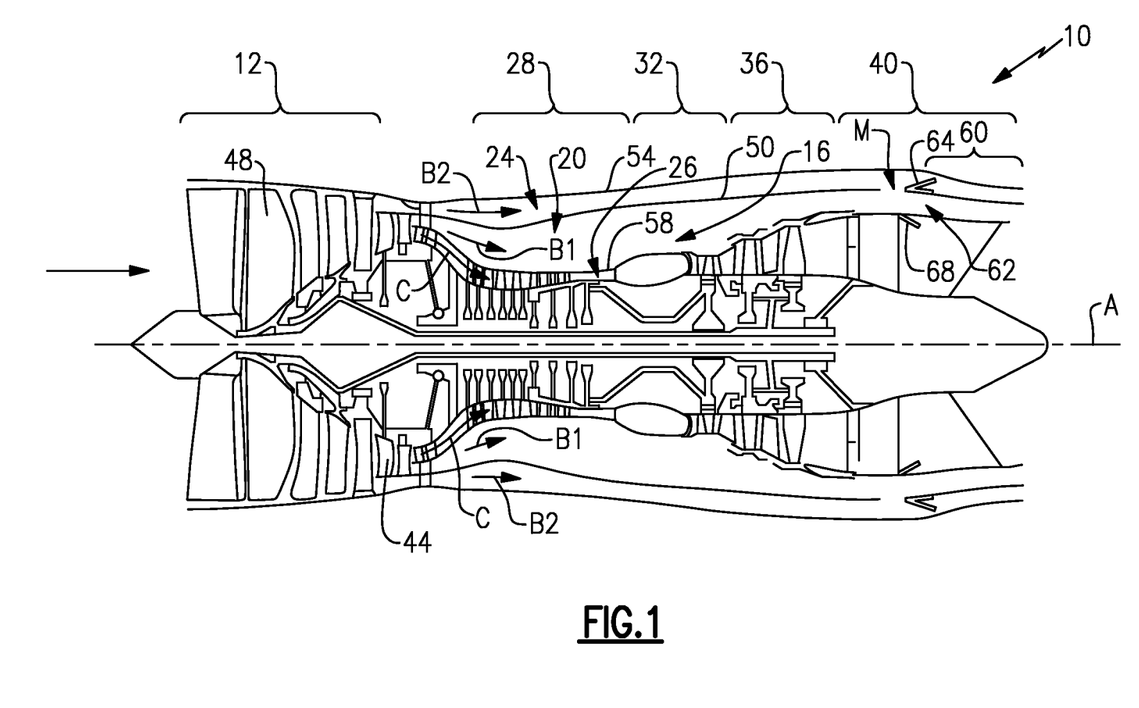
FIG. 1 is a section view of a multiple bypass stream gas turbine engine having an outer flow diverter and an inner flow diverter.

FIG. 1 shows an exemplary engine 10 in a schematic manner. A fan section 12 delivers air into a core engine 16, a radially inner bypass flow passage 20, and a radially outer bypass flow passage 24.

In this example, the radially inner bypass flow passage 20 is a main bypass flow passage and the radially outer bypass flow passage is a third stream bypass flow passage. A main bypass flow B1 moves through the radially inner bypass flow passage 20. A third stream bypass flow B2 moves through the radially outer bypass flow passage.

A core flow C of air is delivered to the core engine 16 from the fan section 12. The core flow C and moves along a core flow passage 26 of the core engine 16 extending through a compressor section 28, a combustor section 32, a turbine section 36, and then an exhaust section 40.

Compressed air from the compressor section 28 is mixed with fuel and ignited in the combustor section 32. The products of combustion drive turbine rotors in the turbine section 36 to rotatably drive compressor rotors in the compressor section 28, and fan rotors 44 and 48 about an axis A.

The fan rotor 44 provides air to the main bypass flow B1 and the core engine flow C. The main bypass flow B1 flows through the radially inner bypass flow passage 20 inwardly of a main bypass flow outer housing 50, and outwardly of a core engine outer housing 58.

The fan rotor 48 provides air to the core engine flow C, the main bypass flow B1, and the third stream bypass flow B2. The third stream bypass flow B2 flows through a radially outer bypass flow passage 24 that is defined radially between an third stream outer housing 54 and the main bypass flow outer housing 50.

Moving axially along the engine 10 in a general direction of flow through the engine 10, the main bypass flow outer housing 50 terminates near the end of the turbine section 36. Terminating the main bypass flow outer housing 50 in this area permits bypass flows B1 and B2 to mix in an area M.

The main bypass flow outer housing 50 begins again in a nozzle portion 60 of the exhaust section 40. Thus, flow through the nozzle portion 60 is again segregated into a main bypass flow B1 and a third stream bypass flow B2.

The exhaust section 40 of the example engine 10 includes a flow diverting assembly 62 to manipulate flow through the exhaust section 40 of the engine 10, and particularly through the nozzle portion 60.

The flow diverting assembly 62 includes an outer flow diverter 64 and an inner flow diverter 68. In this example, the outer flow diverter 64 and the inner flow diverter 68 are at least partially axially aligned.

The outer flow diverter 64 diverts flow from the area M through the radially inner bypass flow passage 20, the radially outer bypass flow passage 24, or both. The inner flow diverter 68 selectively diverts flow from the area M to the core flow passage 26.

When the outer flow diverter 64 is in a first position, more of the mixture of bypass flows B1 and B2 from the area M is directed to the radially inner bypass flow passage 20 within the nozzle portion 60. When the outer flow diverter is moved to a second position, more of the bypass flows B1 and B2 from the mixing area M are directed into the radially outer bypass flow passage 24 within the nozzle portion 60.

The first and second positions for the outer flow diverter 64 are not singular positions in this example. The first position can, for example, include a plurality of possible positions that, relative to other positions, permit more of the mixture of bypass flows B1 and B2 to move from the area M to the radially inner bypass flow passage 20.

The example outer flow diverter 64 is an annular ring formed of multiple individual flaps that overlap each other circumferentially in a shiplapped manner. The example outer flow diverter 64 extends continuously about the axis.

When the inner flow diverter 68 is in a first position, more of the mixture of bypass flows B1 and B2 from the area M can move to the core flow passage 26. When the inner flow diverter 68 is in a second position, less of the mixture of bypass flows B1 and B2 from the area M can move to the core flow passage 26.

The first and second positions for the inner flow diverter 68 are not singular positions in this example. The first position can, for example, refer to a plurality of possible positions that, relative to other positions, permit more of the flow mixture of bypass flows B1 and B2 from the area M can move to the core flow passage 26.

Referring to FIGS. 2 to 6, the outer flow diverter 64 is distributed about the axis A. The outer flow diverter 64 pivots about a circumferentially extending axis 70 when moving back and forth between the first position and the second position. The axis 70 is at a leading edge of the outer flow diverter 64 relative to a general direction of flow through the engine 10. The axis 70 is axially aligned with a leading edge of a turbine exhaust case 84 of the engine 10.

The example outer flow diverter 64 includes two flaps 74 and 78 extending aftward from the pivot at the axis 70. The outer flow diverter 64 is tapered and has an apex at the leading edge near the pivot at the axis 70.

In this example, a hydraulic actuator system 88 pivots the outer flow diverter 64 back and forth between the first position and the second position. The system 88 can include a bellcranks, torque tubes, sync rings, etc.

Actuation systems 88 other than hydraulic could be used in other examples, a person having skill in this art and the benefit of this disclosure may comprehend other actuation systems suitable for moving the outer flow diverter 64.

The inner flow diverter 68 is also distributed about the axis. The inner flow diverter 68 pivots about a circumferentially extending axis 82 when moving back forth between the first position and the second position. The axis 82 is at a leading edge of the inner flow diverter 68 relative to the general direction of flow through the engine 10. The axis 82 is axially aligned with the leading edge of the turbine exhaust case 84 of the engine 10.

The example inner flow diverter 68 includes a single flap 86 extending aftward from the axis 82. The flap 86 can move to a position that blocks flow through an opening 90. The inner flow diverter 68 can be actuated using an actuation system similar to that used to actuate the outer flow diverter 64.

The inner flow diverter 68 can include several individual diverters distributed about the axis A and positioned circumferentially between vanes of the turbine exhaust case 84. The inner flow diverters 68 can be a sliding seal or door.

In another example, an inner flow diverter can be positioned within vanes of the turbine exhaust case and selectively permit flow inside the vanes.

Figure 2:
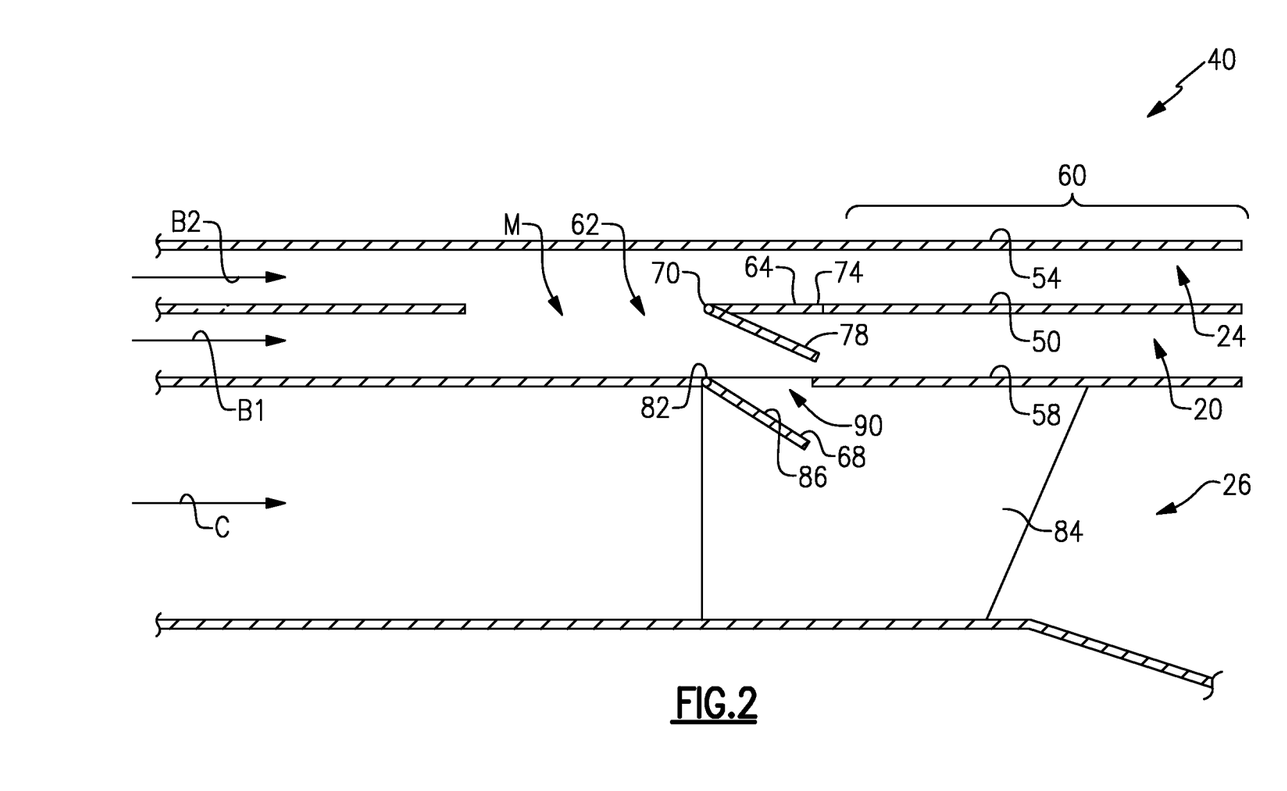
FIG. 2 is a close-up section view of a portion of the engine of FIG. 1 having the outer flow diverter and the inner flow diverter.
Figure 3:
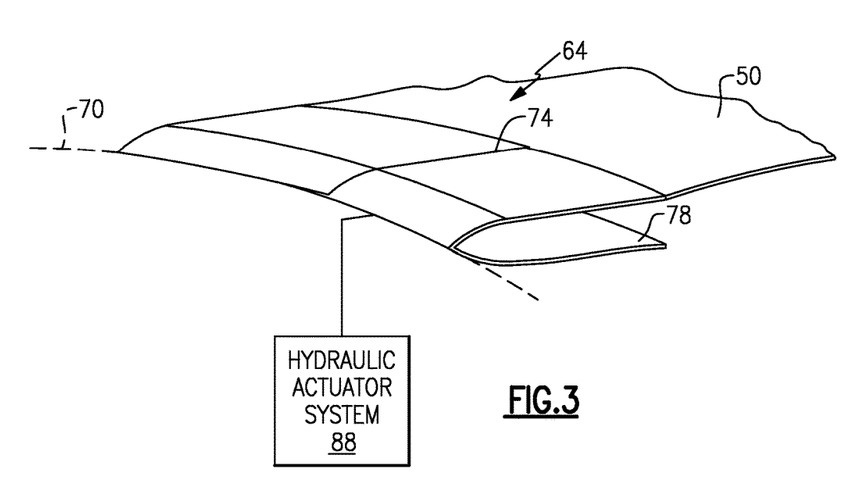
FIG. 3 shows a perspective section view of the outer flow diverter in the position of FIG. 2.

When the outer flow diverter 64 is in the position of FIGS. 2 and 3, the first flap 74 is in a fully open position permitting flow from the mixing area M to the radially outer bypass flow passage 24, Also, the second flap 78 blocks nearly all flow from the mixing area M into the radially inner bypass flow passage 20.

When the inner flow diverter 68 is in the position of FIGS. 2 and 3, about half of the opening 90 is blocked by the flap 86.

The positioning of the outer flow diverter 64 and the inner flow diverter 68 shown in FIGS. 2 and 3 can provide relatively high cooling of the nozzle portion 60, a relatively moderate cooling of the turbine exhaust case 84.

Figure 4:
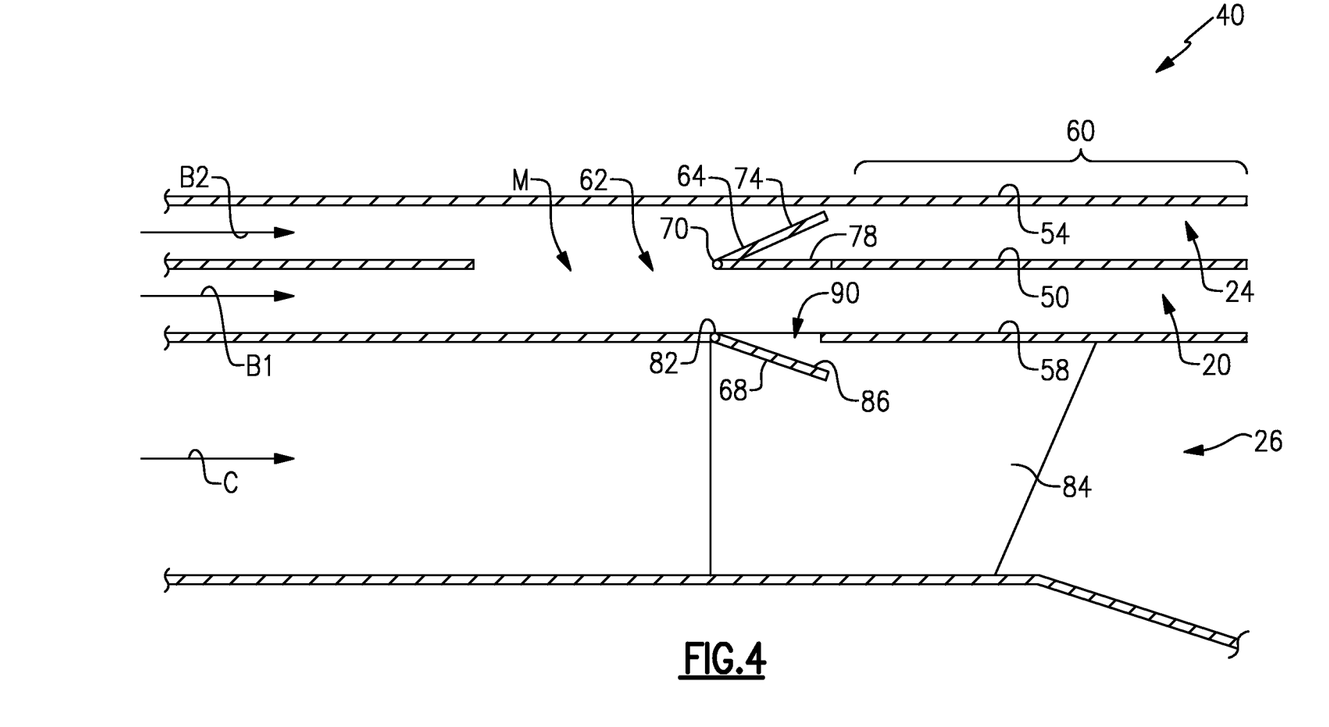
FIG. 4 is a close-up view of the portion of FIG. 2 showing the outer flow diverter and the inner flow diverter moved from the position of FIG. 2.
Figure 5:
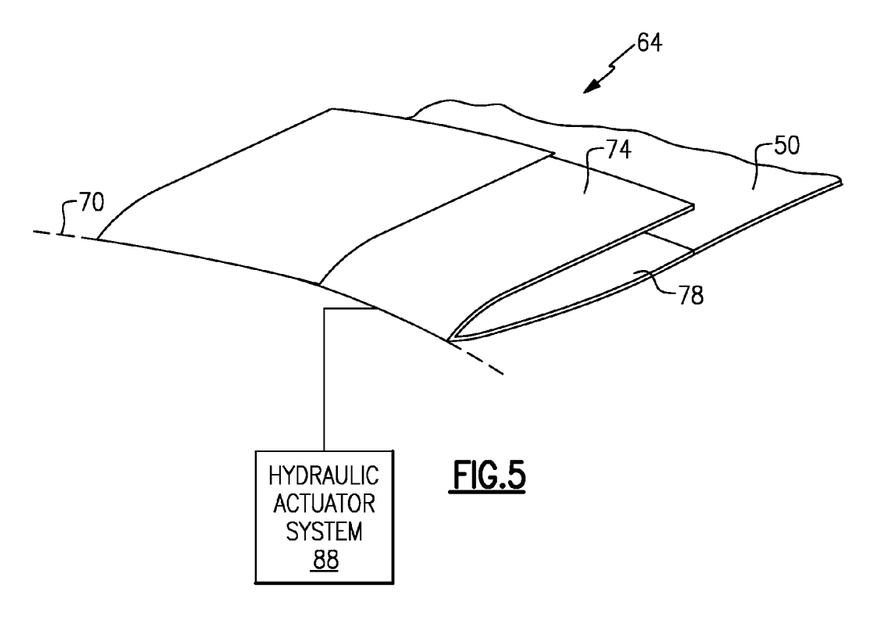
FIG. 5 shows a perspective section view of the outer flow diverter in the position of FIG. 4.

When the outer flow diverter 64 is in the position of FIGS. 4 and 5, the first flap 74 is in an almost closed position permitting very little, if any flow from the mixing area M to the radially outer bypass flow passage 24. Also, the second flap 78 is in a fully open position permitting flow from the mixing area M into the radially inner bypass flow passage 20.

When the inner flow diverter 68 is in the position of FIGS. 4 and 5, all, or nearly all, of the opening 90 is blocked by the flap 86.

The positioning of the outer flow diverter 64 and the inner flow diverter 68 shown in FIGS. 4 and 5 can provide relatively low cooling of the turbine exhaust case 84, but high flow through the main bypass flow passage 20, which can provide efficient thrust.

Figure 6:
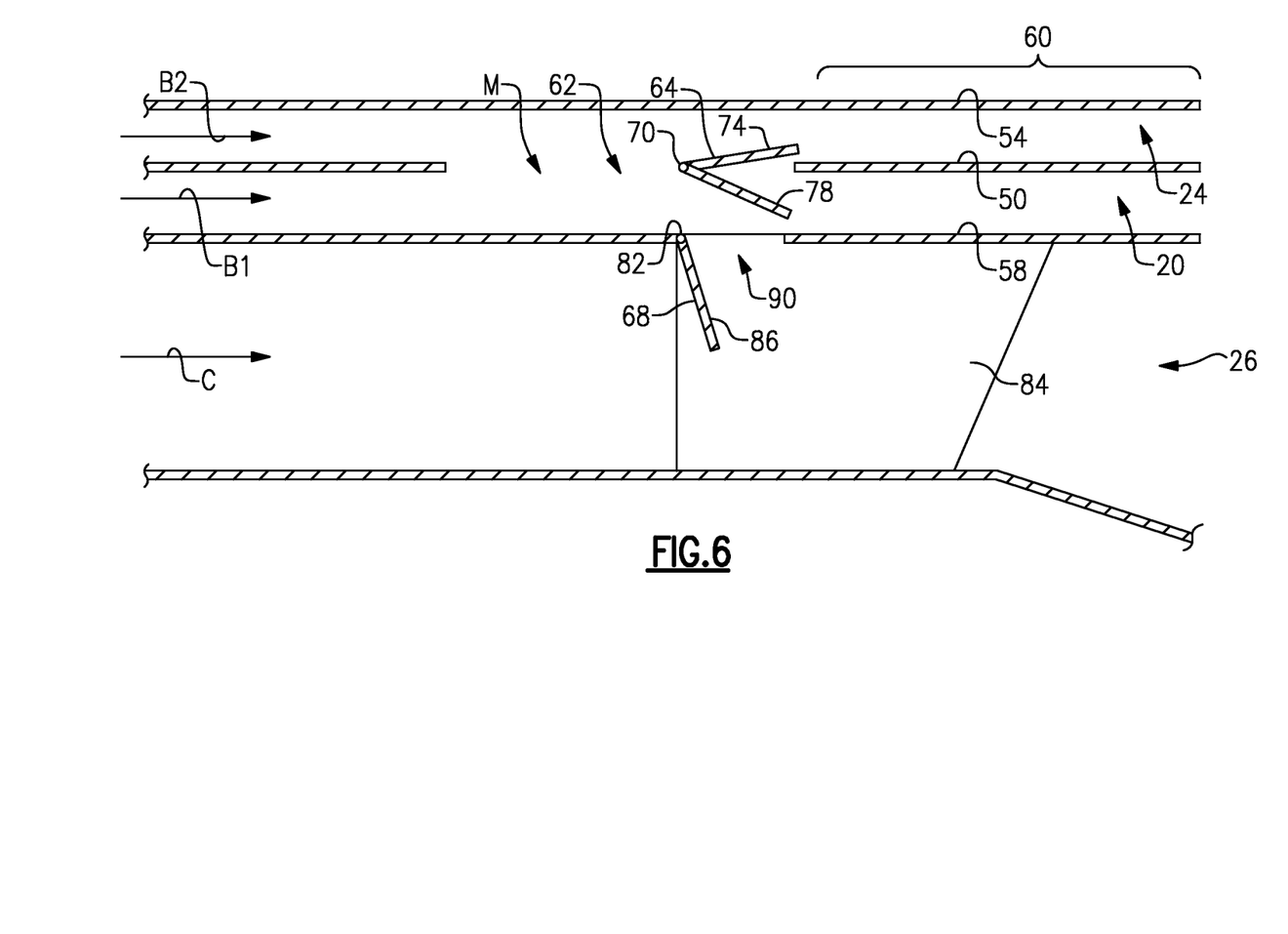
FIG. 6 is a close-up view of the portion of FIG. 2 showing the outer flow diverter and the inner flow diverter moved from the positions of FIG. 2.

When the outer flow diverter 64 is in the position of FIG. 6, the first flap 74 is in a position blocking approximately one thirds of the opening to the radially outer bypass flow passage 24. Also, the second flap 78 blocks about two thirds of the opening to the radially inner bypass flow passage 20.

When the inner flow diverter 68 is in the position of FIG. 6, the opening 90 is effectively fully open and flow through the opening from the area M is not blocked by the flap 86.

The positioning of the outer flow diverter 64 and the inner flow diverter 68 can provide relatively high cooling of turbine exhaust case 84, a relatively moderate cooling of the nozzle portion 60.

The example engine 10 includes the area M where the bypass flows B1 and B2 can mix upstream from outer flow diverter 64 and the nozzle portion 60.

In another example engine, the main bypass flow outer housing 50 extends axially to the outer flow diverter 64, which prevents the bypass flow B1 from mixing with the bypass flow B2 upstream from the outer flow diverter 64. In such an example, the outer flow diverter 64 selectively directs bypass flow B1 from the radially inner bypass flow passage 20 to the radially outer bypass flow passage 24, and bypass flow B2 from the radially outer bypass flow passage 24 to the radially inner bypass flow passage 20. Further, the inner flow diverter 68 selectively directs bypass flow B1 to move to the core engine 16 instead of a mix of the bypass flows B1 and B2.

Figure 7:
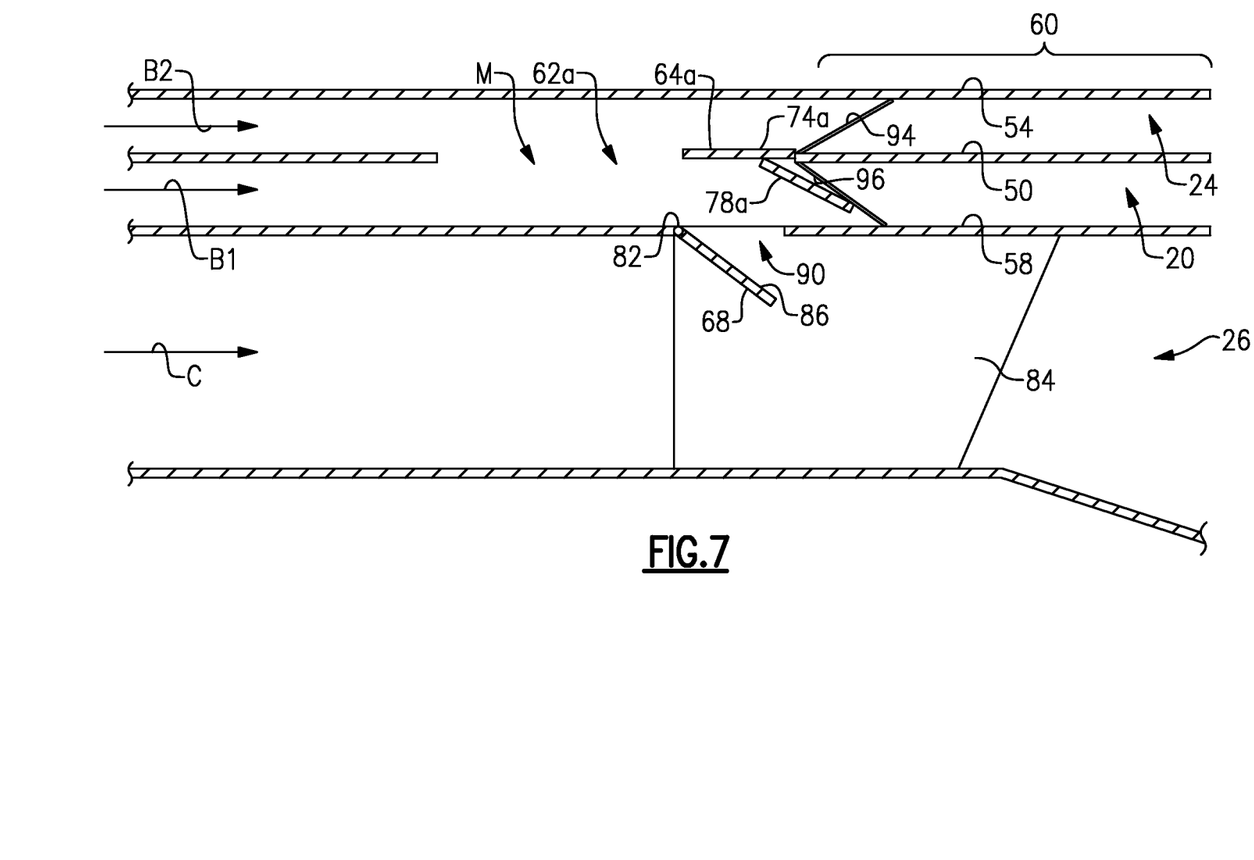
FIG. 7 is a close-up view of a portion of another example engine having another embodiment of the outer flow diverter and another embodiment of the inner flow diverter.
Figure 8:
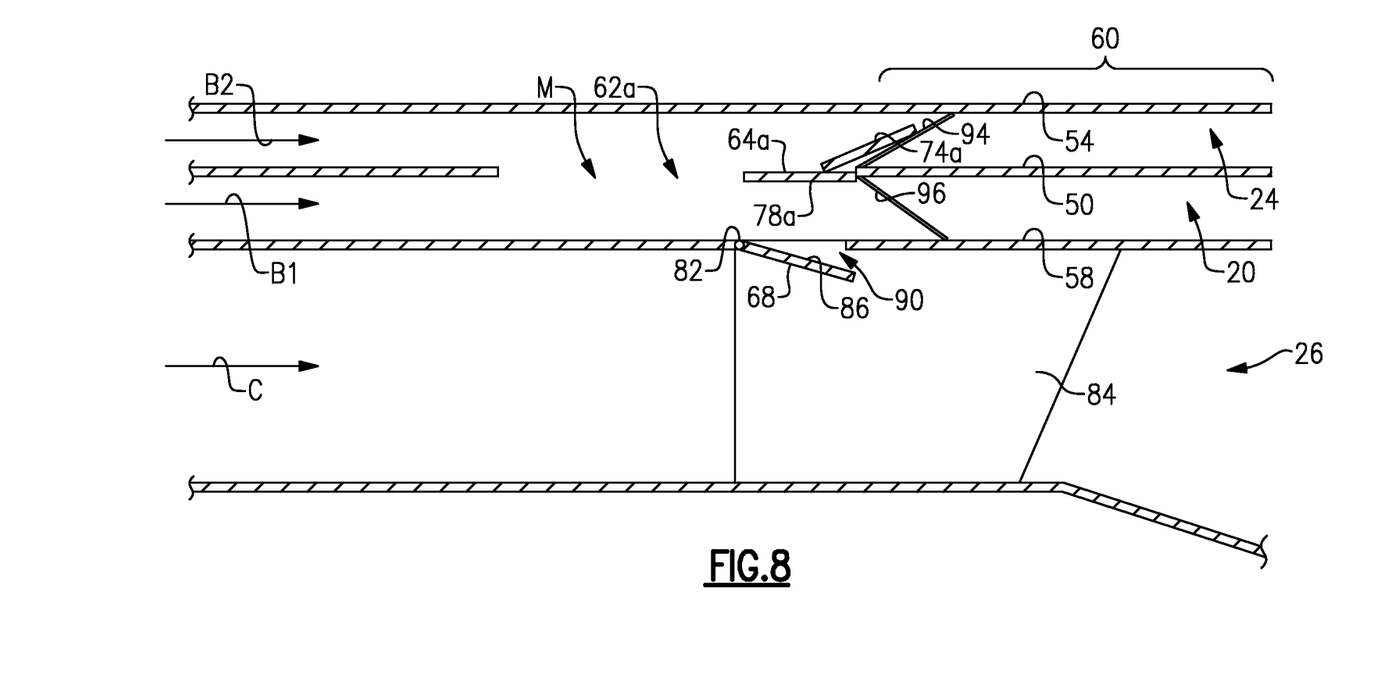
FIG. 8 is a close-up view of the portion of the engine of FIG. 7 showing the outer flow diverter and the inner flow diverter moved from the positions of FIG. 7.
Figure 9:
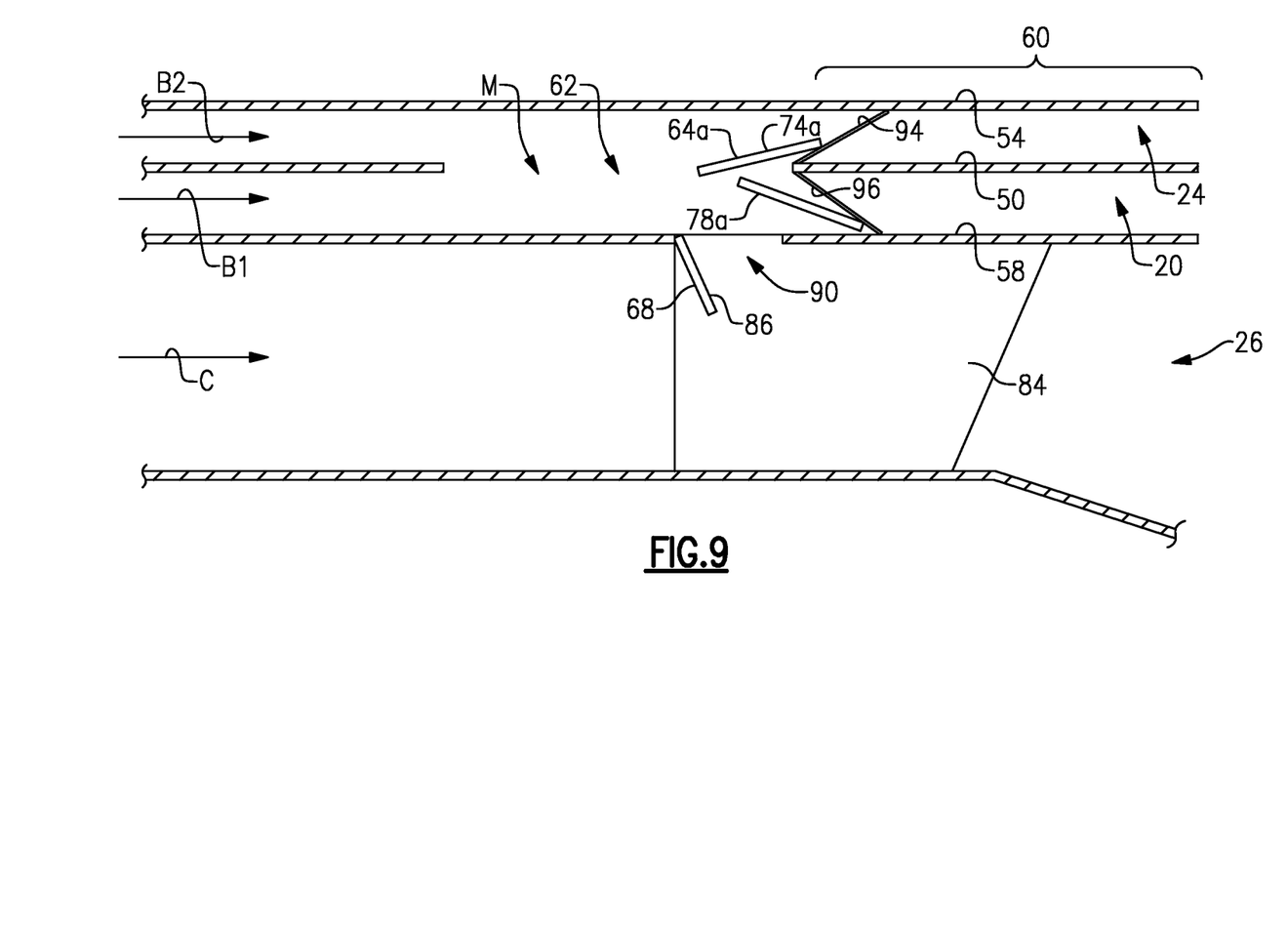
FIG. 9 is a close-up view of the portion of the exhaust of FIG. 7 showing the outer flow diverter and the inner flow diverter moved from the positions of FIG. 8.

Referring now FIGS. 7 to 9, in another example embodiment, a flow diverting assembly 62a includes an outer flow diverter 64a. The inner flow diverter 68 in this engine is similar to the inner flow diverter 68 of the engine 10.

The outer flow diverter 64a includes a first flap 74a and a second flap 78a. The flaps 74a and 78a slide to move the outer flow diverter 64a back and forth between first positions and second positions.

To control the sliding of the first flap 74a, a rail 94 extends, within the exhaust section 60, from the main bypass flow outer housing 50 aftward to the third stream outer housing 54. The first flap 74a can be one of several individual flaps distributed circumferentially about the axis A. As the first flap 74a transitions, for example, from the position of FIG. 7 to the position of FIG. 8, an outer circumferential edge of the first flap 74a slides along the rail 94 to control movement of the first flap 74a. The opposing outer circumferential edge of the first flap 74a can slide along another rail.

To control the sliding of the second flap 78a, a rail 96 extends, within the exhaust section 60, from the main bypass flow outer housing 50 aftward to the core engine outer housing 58. The second flap 78a can be one of several individual flaps distributed circumferentially about the axis A. As the second flap 78a transitions, for example, from the position of FIG. 7 to the position of FIG. 8, an outer circumferential edge of the second flap 78a slides along the rail 96 to control movement of the second flap 78a. The opposing outer circumferential edge of the second flap 78a can slide along another rail.

A hydraulic actuation system can be used to move the flaps 74a and 78a back and forth between the first positions and the second positions.

The outer flow diverter 64a in the position of FIG. 7 diverts flow similarly to the outer flow diverter 64 in FIG. 2. The outer flow diverter 64a in the position of FIG. 8 diverts flow similarly to the outer flow diverter 64 in FIG. 4. The outer flow diverter 64a in the position of FIG. 9 diverts flow similarly to the outer flow diverter 64 in FIG. 6.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A turbomachine exhaust flow diverting assembly, comprising:
    an outer flow diverter distributed about a rotational axis of a turbomachine, the outer flow diverter moveable between a first position and a second position;
    a main bypass flow passage extending between a core engine outer housing and a main bypass flow outer housing;
    a third stream bypass flow passage extending between the main bypass flow outer housing and a third stream outer housing;
    wherein the main bypass flow outer housing defines an area upstream of the outer flow diverter that permits bypass flow from the main bypass flow passage and bypass flow from the third stream bypass flow passage to mix into a mixed flow;
    wherein the outer flow diverter in the first position permits more of the mixed flow through the main bypass flow passage and less of the mixed flow through the third stream bypass flow passage; and
    wherein the outer flow diverter in the second position permits more of the mixed flow through the third stream bypass flow passage and less of the mixed flow through the main bypass flow passage.

2. The assembly of claim 1, wherein the outer flow diverter pivots about a circumferentially extending axis to move between the first position and the second position.

3. The assembly of claim 2, wherein the circumferentially extending axis is at a leading edge of the outer flow diverter relative to a general direction of flow through the turbomachine.

4. The assembly of claim 3, wherein the outer flow diverter is tapered and has an apex at the leading edge.

5. The assembly of claim 1, wherein the outer flow diverter comprises a first flap and a second flap, the first flap moveable independently from the second flap, and the second flap moveable independently from the first flap.

6. The assembly of claim 5, wherein the first flap blocks more of the mixed flow through the third stream bypass flow passage when the outer flow diverter is in the first position than when the outer flow diverter is in the second position, wherein the second flap blocks more of the mixed flow through the main bypass flow passage when the outer flow diverter is in the second position than when the outer flow diverter is in the first position.

7. The assembly of claim 1, wherein the outer flow diverter is at least partially axially aligned with a portion of a turbine exhaust case.

8. The assembly of claim 1, further comprising an inner flow diverter distributed about the rotational axis of the turbomachine, the inner flow diverter positioned radially inside the outer flow diverter.

9. The assembly of claim 8, wherein the inner flow diverter is moveable between a first position and a second position, the inner flow diverter in the first position permitting more of the mixed flow from the main bypass flow passage to a core flow passage than the second position.

10. The assembly of claim 9, wherein the inner flow diverter is at least partially axially aligned with a portion of a turbine exhaust case.

11. The assembly of claim 10, wherein:
    the outer flow diverter includes a first flap and a second flap joined at an apex along a leading edge of the outer flow diverter relative to a general direction of flow through the turbomachine, the first and second flaps pivotable about a circumferentially extending axis defined along the leading edge, the first flap pivotable into the third stream bypass flow passage, and the second flap pivotable into the main bypass flow passage;
    the inner flow diverter includes a third flap pivotable into the core flow passage; and
    the first, second and third flaps are at least partially axially aligned with respect to the rotational axis.

12. The assembly of claim 11, wherein the turbine exhaust case is radially inward of the main bypass flow passage with respect to the rotational axis.

13. The assembly of claim 9, wherein the inner flow diverter is pivotable about a circumferentially extending axis to move between the first position and the second position.

14. The assembly of claim 9, wherein the inner flow diverter is pivotable about a circumferentially extending axis that is radially aligned with a radially outer boundary of the core flow passage.

15. The assembly of claim 9, wherein at least a portion of the outer flow diverter is axially aligned with at least a portion of the inner flow diverter.

16. A turbomachine assembly, comprising:
    a core flow passage extending axially from a fan section to an exhaust the core flow passage extending inwardly of a core engine outer housing with aspect to a rotational axis of a turbomachine;
    a radially inner bypass flow passage that is radially outside the core flow passage, the radially inner bypass flow passage extending between the core engine outer housing and a main bypass flow outer housing;
    a radially outer bypass flow passage that is radially outside the radially inner bypass flow passage, the radially outer bypass flow passage extending between the main bypass flow outer housing and a third stream outer housing;
    an outer flow diverter;
    wherein the main bypass flow outer housing defines an area upstream of the outer flow diverter that permits bypass flow from the radially inner bypass flow passage and bypass flow from the radially outer bypass flow passage to mix into a mixed flow;
    wherein the outer flow diverter is moveable between a first position and a second position, the outer flow diverter in the first position permitting more of the mixed flow through the radially inner bypass flow passage and less of the mixed flow through radially outer bypass flow passage, the outer flow diverter in the second position permitting more of the mixed flow through the radially outer bypass flow passage and less of the mixed flow through the radially inner bypass flow passage; and
    an inner flow diverter moveable between a first position and a second position, the inner flow diverter in the first position permitting more of the mixed flow from at least one of the radially inner bypass flow passage or the radially outer bypass flow passage to the core flow passage than the second position.

17. The assembly of claim 16, wherein the outer flow diverter is radially aligned with a boundary between the radially inner bypass flow passage and the radially outer bypass flow passage.

18. The assembly of claim 16, wherein the inner flow diverter is radially aligned with a boundary between the core flow passage and the radially inner flow passage.

19. The assembly of claim 18, wherein:
the inner flow diverter is radially aligned with a boundary between the core flow passage and the radially inner flow passage;
the outer flow diverter includes a first flap and a second flap joined at an apex at a leading edge of the outer flow diverter relative to a general direction of flow through the turbomachine, the first flap pivotable into the third stream bypass flow passage, and the second flap pivotable into the main bypass flow passage;
the inner flow diverter includes a third flap pivotable into the core flow passage; and
the first, second and third flaps are at least partially axially aligned with respect to the rotational axis.

20. The assembly of claim 16, wherein the outer flow diverter is pivotable between the first position ad the second position.

21. A method of diverting flow through an exhaust of a turbomachine, comprising:
moving a flow diverter assembly between a first position and a second portion, the flow diverter assembly including moor and outer flow diverters distributed about a rotational axis of a turbomachine;
wherein a core flow passage extends inwardly of a core engine outer housing with respect to the rotational axis;
wherein a radially inner bypass flow passage extends between the core engine outer housing and a main bypass flow outer housing;
wherein a radially outer bypass flow passage extends between the main bypass flow outer housing and a third stream outer housing;
wherein the main bypass flow outer housing defines an area upstream of the Dow diverter assembly that permits bypass flow from the main bypass flow passage and bypass flow from the third stream bypass flow passage to mix into a mixed flow;
selectively permitting the mixed flow to move from the radially inner bypass flow passage to the core flow passage in response to the flow diverter assembly moving to the first position;
selectively directing the mixed flow to move to the radially inner bypass flow passage, the radially outer bypass flow passage, or both in response to the flow diverter assembly moving to the second position; and
wherein the outer flow diverter includes a first flap and a second flap moveable along a boundary between the core flow passage and the radially inner flow passage, the inner flow diverter includes a third flap, and the first, second end third flaps are at least partially axially aligned with respect to the rotational axis.

22. The method of claim 21, wherein the first position and the second position are at least partially axially aligned with a turbine exhaust case.

23. The method of claim 22, wherein the step of selectively directing the mixed flow to move to the radially inner bypass flow passage, the radially outer bypass flow passage, or both includes pivoting the first and second flaps of the outer flow diverter, the first and second flaps joined at an apex along a leading edge of the outer flow diverter.

\* \* \* \* \*

UNITED STATES PATENT AND TRADEMARK OFFICE
CERTIFICATE OF CORRECTION

PATENT NO. : 10,190,506 B2  
APPLICATION NO. : 14/953483  
DATED : January 29, 2019  
INVENTOR(S) : Jose E. Ruberte Sanchez Page 1 of 1

It is certified that error appears in the above-identified patent and that said Letters Patent is hereby corrected as shown below:

In the Claims

In Claim 16, Column 8, Line 27; replace "exhaust the core" with --exhaust, the core--

In Claim 16, Column 8, Line 40; replace "through radially" with --through the radially--

In Claim 20, Column 9, Line 16; replace "position ad the second" with --position and the second--

In Claim 21, Column 9, Line 22; replace "including moor and" with --including inner and--

In Claim 21, Column 10, Line 2; replace "of the Dow" with --of the flow--

In Claim 21, Column 10, Line 18; replace "the first, second end third flaps" with --the first, second and third flaps--

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*